United States Patent [19]

Zitting

[11] Patent Number: 4,566,703
[45] Date of Patent: Jan. 28, 1986

[54] SEAL ASSEMBLY

[75] Inventor: Gordon T. Zitting, Sandy, Utah

[73] Assignee: Microdot Incorporated, Chicago, Ill.

[21] Appl. No.: 503,941

[22] Filed: Jun. 13, 1983

Related U.S. Application Data

[63] Continuation-in-part of Ser. No. 257,045, Apr. 24, 1981, abandoned, which is a continuation of Ser. No. 58,341, Jul. 17, 1979, abandoned, which is a continuation-in-part of Ser. No. 883,448, Mar. 6, 1978, abandoned.

[51] Int. Cl.⁴ .......................... F16J 9/06; F16J 15/24
[52] U.S. Cl. ................................................... 277/165
[58] Field of Search ................... 277/165, 188 A, 213

[56] References Cited

U.S. PATENT DOCUMENTS

| | | | |
|---|---|---|---|
| 3,149,848 | 9/1964 | Galloway | 277/165 |
| 3,418,001 | 12/1968 | Rentschler et al. | 277/165 |
| 3,663,024 | 5/1972 | Traub | 277/165 |
| 3,727,924 | 4/1973 | Jones | 277/165 |
| 3,920,252 | 11/1975 | Dechavanne | 277/165 |
| 3,999,767 | 12/1976 | Sievenpiper | 277/165 |

*Primary Examiner*—Robert I. Smith
*Attorney, Agent, or Firm*—Lynn G. Foster

[57] ABSTRACT

A two element, high and low pressure seal assembly to be used in a hydraulic or pneumatic sealing environment between two relatively movable machine parts, the seal assembly comprising a spring element, circular or rectangular in cross-section and made of a relatively soft elastomeric material, and spring element being substantially contiguously surrounded along all but a small exposed area and contained within an annular slot of a house-shaped elastomeric annular sealing member whereby an integral assembly is formed for easy installation and unitary response. The house-shaped sealing element comprises a central body from which two anti-extrusion legs radially extend. The legs are located fore and aft of the spring element within an annular peripheral groove in one machine part and are disposed perpendicular or radial to the axis of said machine part. Projecting radially beyond said machine part is a convergingly tapered gabled surface defining a central apex or tip portion, said tip portion creating a narrow band contact dynamic seal area between the apex per se and the second machine part when the seal assembly is in said machine part groove and compressed between the two machine parts. The sealing element may project either radially inwardly or radially outwardly from the spring element. The axial dimension of the entire seal assembly is slightly smaller than the axial dimension of the machine groove.

8 Claims, 9 Drawing Figures

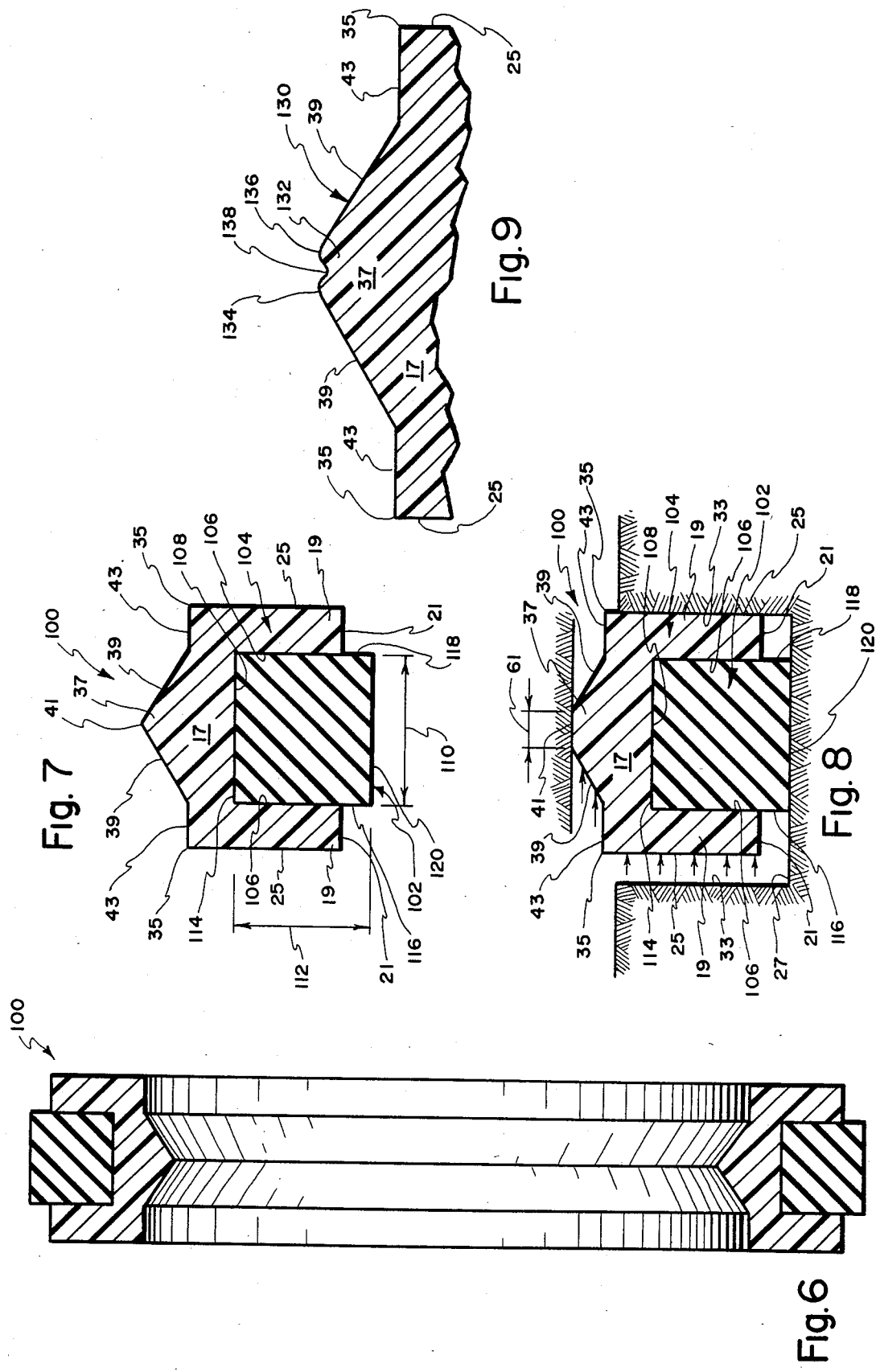

SEAL ASSEMBLY

BACKGROUND

Continuity

This application is a continuation-in-part of my copending U.S. patent application Ser. No. 257,045, filed Apr. 24, 1981, now abandoned which is a continuation-in-part of my copending U.S. patent application Ser. No. 058,341, filed July 17, 1979, now abandoned, which was a continuation of my copending U.S. patent application Ser. No. 883,448, filed Mar. 6, 1978 now abandoned.

FIELD OF INVENTION

This invention relates generally to hydraulic seals and more particularly to a novel single apex two element high and low pressure seal assembly.

PRIOR ART

In the past, it has been common to provide two-part seals for hydraulic and pneumatic use wherein the seal assembly is placed in a standard groove of one machine part to project toward and engage a second relatively movable machine part, the object being to prevent fluid displacement across such sites. The use of such two-part seal assemblies of the prior art has often resulted in misorientation, twisting, rolling and extrusion of the yieldable sealing element so that the initial fluid-tight relationship is lost. Thus, such prior art proposals have regularly experienced seal failure because of lack of resistance to pressures imposed upon the seal. Wide contact area seals proposed in the past provide at best limited pressure resistance to fluid displacement across the seal and at the same time cause an increase in frictional resistance to displacement of the two machine parts. These types of seal assembly configurations commonly permit an unacceptably high level of fluid leakage across the seal site.

In addition, specially configurated and expensive machine part grooves and seal assembly components are frequently required. Often, a plurality of seals or a plurality of seal assemblies or a plurality of dynamic seal areas are required between machine parts, which introduce complexity and cost factors which make production prohibitive. Many such prior art seal proposals commonly loosen with wear and often the two elements of the seal assembly are relatively instable one in respect to the other. Thus, each of the two seal members will displace relative to the other during use.

Examples of broad seals which result in limited resistance to fluid displacement with increased friction and wear and across which leakage often occurs, sometimes at high pressures and nearly always at low pressures are U.S. Pat. Nos. 3,636,824; 3,149,848; and 3,418,001. The first mentioned patent also is an example of plural seal assemblies being required between machine parts. U.S. Pat. No. 3,268,235 is an example of requiring a plurality of spaced sealing surfaces, interrupted in each instance by a groove.

Examples of instability between the two seal elements of the seal assembly are found in U.S. Pat. Nos. 3,328,041; 2,931,673; re 24,440; 3,663,024, and 2,877,070. U.S. Pat. No. 3,418,001 also comprises a two-part seal assembly where the two parts do not work substantially in unison but rather may be independently displaced. U.S. Pat. No. 3,663,024 also illustrates a spring loaded triangular seal, where the two parts thereof are allowed to respond during use substantially independent of each other.

In addition, it has sometimes been proposed that the sealing element be supported not only by the second element but also upon shoulders in the one machine part directly adjacent to the machine groove. See U.S. Pat. No. 3,814,445. Further, sometimes unusually configurated grooves possessing special structural characteristics for retaining the seal assembly have been proposed. See U.S. Pat. No. 2,915,349.

BRIEF SUMMARY AND OBJECTS OF THE INVENTION

The present invention comprises a single apex portion, two element high and low pressure seal assembly comprising a relatively soft elastomeric annular spring element which acts to urge a relatively hard elastomeric house-shaped sealing element into a compressed, high resistant pressure, narrow band, stable dynamic sealing engagement. The elastomeric sealing element is annular in configuration and envelopes within its hollow interior all but a small exposed portion of the surface area of the spring element for unitary installation and unitary response during use. The sealing member comprises a body from which two spaced substantially parallel anti-extrusion annular legs extend in a radial direction, the interior of the sealing member engaging all but said small exposed portion of the surface of the spring element, the exposed portion of the spring element creating a static seal by engagement with the base of a groove in a first machine part. The anti-extrusion legs, thus, in effect lock the spring element and the sealing element together for stable, unitary response, the legs, inter alia, uniquely preventing the element from rolling when subjected to high pressure. The machine groove comprises normally not only an annular flat base but spaced parallel radially directed sidewall surfaces. The exterior surface of each of the two anti-extrusion legs are parallel to each other and to the radially directed sidewalls of the machine groove. The seal assembly defines a cumulative axial seal dimension slightly less than the axial dimension of the machine groove. Accordingly, under pressure, an anti-extrusion seal area is created between the radial wall of the groove opposite the pressure and the contiguous exterior surface of the adjacent leg of the sealing element. A delta-shaped projection comprising sloped side surfaces and a centrally disposed apex portion extends from the body of the sealing member away from the groove of the one machine part into compressed, load resistant, dynamically sealed interface contact with a very narrow ribbon or band area of a relatively movable second machine part. The narrow ribbon or band is of very limited area and surprisingly causes an extraordinarily high unit pressure to exist at the ribbon which is substantially greater than any hydraulic pressure caused to be exerted against either side of the seal assembly. The apex portion may comprise a slight annular indentation at the tip portion. Each sloped side surface of the delta-shaped projection preferably merges into an annular flat exposed shoulder spaced from but substantially parallel to the base of the machine groove which in turn merges at substantially ninety degrees (90°) with an exposed heel of the exterior surface of the adjacent anti-extrusion leg.

With the foregoing in mind, it is a primary object of the present invention to provide a novel high and low pressure, efficient, two element sealing assembly.

A further important object of the present invention is to provide a unique annular, two element seal assembly comprising a house-shaped, single apex, restricted contact sealing element and a spring element located within a U-shaped cavity of the sealing element which elements function in unison as a compression or squeeze type seal assembly.

It is a further paramount object of the present invention to provide a novel two element seal assembly comprising a spring element and a sealing element having a delta-shaped projection by which a narrow band or line seal is created with an opposed machine part which surprisingly creates extraordinarily high unit pressure greater than the hydraulic or pneumatic pressures imposed upon the assembly.

An additional dominant object of the present invention is the provision of a novel two element seal assembly having a unitary male/female relationship, the sealing member having anti-extrusion legs substantially straddling the spring element, thereby stabilizing the sealing element not only against extrusion but against roll.

A further primary object is the provision of a novel two element seal assembly comprising a relatively soft elastomeric spring element and a relatively hard or wear compensating elastomeric sealing element which firmly but narrowly engages a relatively moving machine part.

A further significant object according to the present invention is the provision of a novel two element seal assembly by which a single narrow dynamic seal area is created between the sealing element and a relatively movable machine part, an anti-extrusion seal is created between an anti-extrusion leg of the sealing element and a groove wall of a second machine part and a static seal is created between a spring element of the seal assembly and the base of the machine groove.

An additional object of significance is the provision of a novel two element seal assembly where the sealing element and spring element function in unison within a machine groove, the axial dimension of which is slightly greater than the axial dimension of the seal assembly.

A further significant object of the invention is the provision of the house-shaped annular sealing member having a delta-shaped apex portion projecting beyond one machine part into compressed sealing engagement with another machine part along a narrow interference region, creating a high unit pressure resistance at said region to obviate seal failure, fluid leakage across the seal and minimizing wear and its effects.

A further important object is the provision of a novel two element seal assembly which can be used in connection with and is resistant to all petroleum, water-glycol, water-oil and other emulsions as well as hydraulic fluids having temperatures within the operating range of −90° F. to +500° F.

It is a further important object of the present invention to provide a novel two element seal which is resistant to phosphate ester.

A further important object is the provision of a novel two element seal which will not fail or permit fluid leakage thereacross when exposed to pressures ranging from vacuum to over 10,000 pounds per square inch and in environments which are abrasive, wet or chemically corrosive.

These and other objects and features of the present invention will be apparent from the detailed description taken with reference to the accompanying drawings.

BRIEF DESCRIPTION OF THE DRAWINGS

FIG. 6 is a cross-sectional representation of a third preferred two element seal assembly according to the present invention;

FIG. 7 is an enlarged fragmentary cross-sectional representation of the seal assembly of FIG. 6 in an unstressed condition.

FIG. 8 is an enlarged fragmentary cross-sectional representation of the seal assembly of FIG. 6 installed within a groove of one machine part and compressed in sealing relation against a second machine part; and FIG. 9 is an enlarged fragmentary cross section of a fourth preferred embodiment of the invention.

DETAILED DESCRIPTION OF THE ILLUSTRATED EMBODIMENTS

Figure 1:
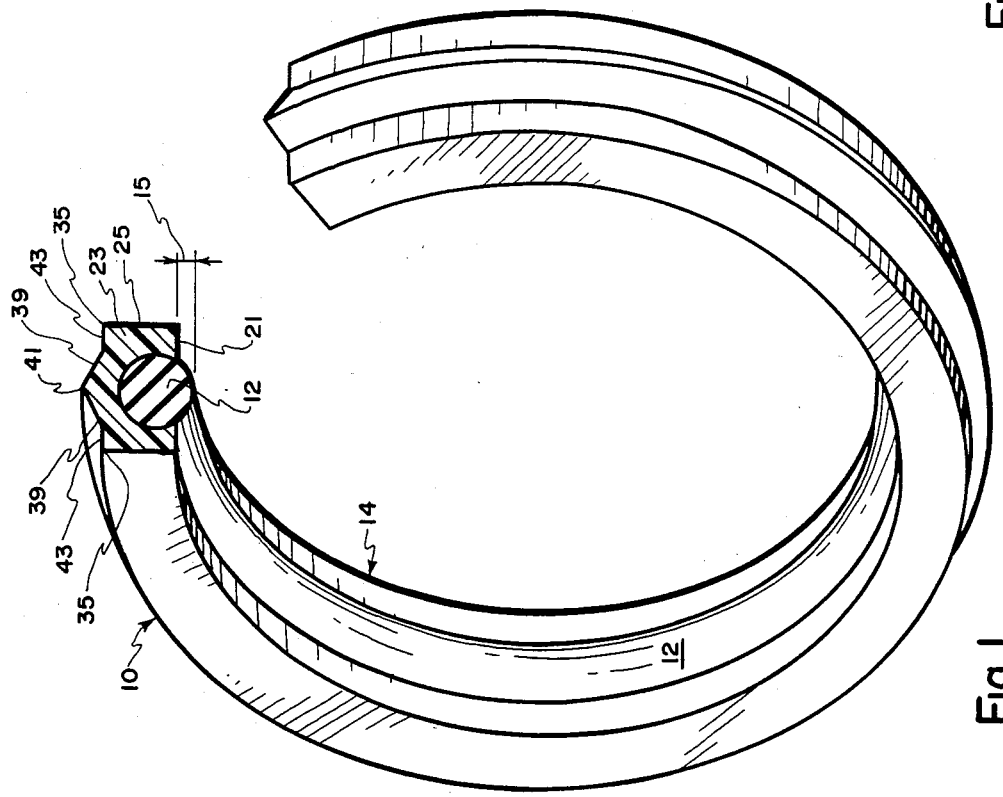
FIG. 1 is a perspective representation of one presently preferred two element seal assembly embodiment according to the present invention with a portion thereof broken away to increase clarity.
Figure 4:
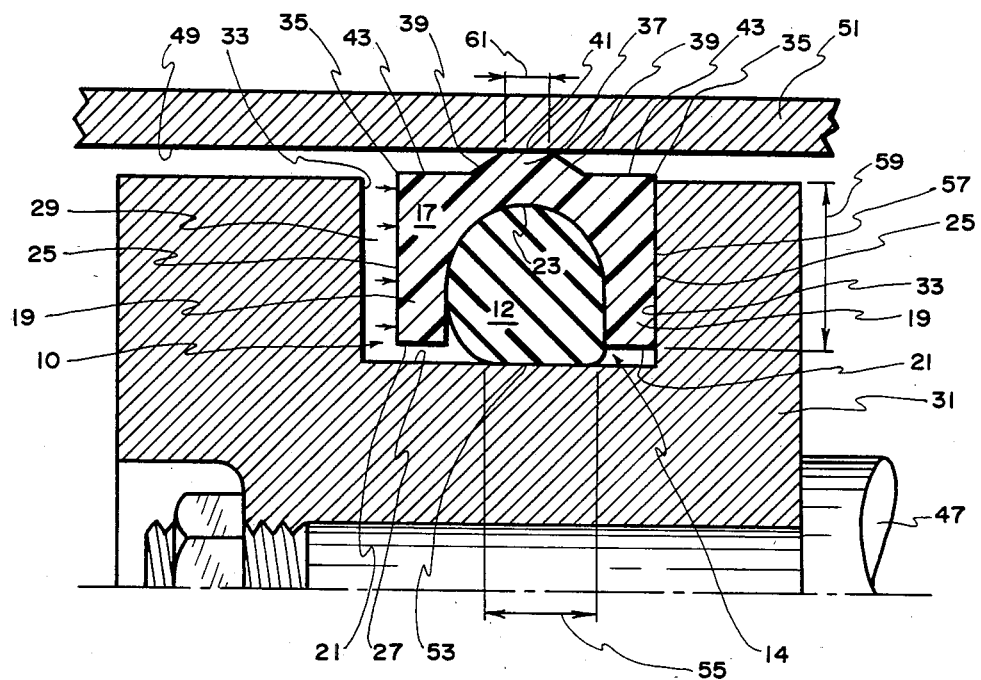
FIG. 4 is an enlarged fragmentary cross-sectional representation illustrating the one dynamic and two static seal areas created when the seal is disposed as indicated in FIG. 3 and subjected to pressure.
Figure 5:
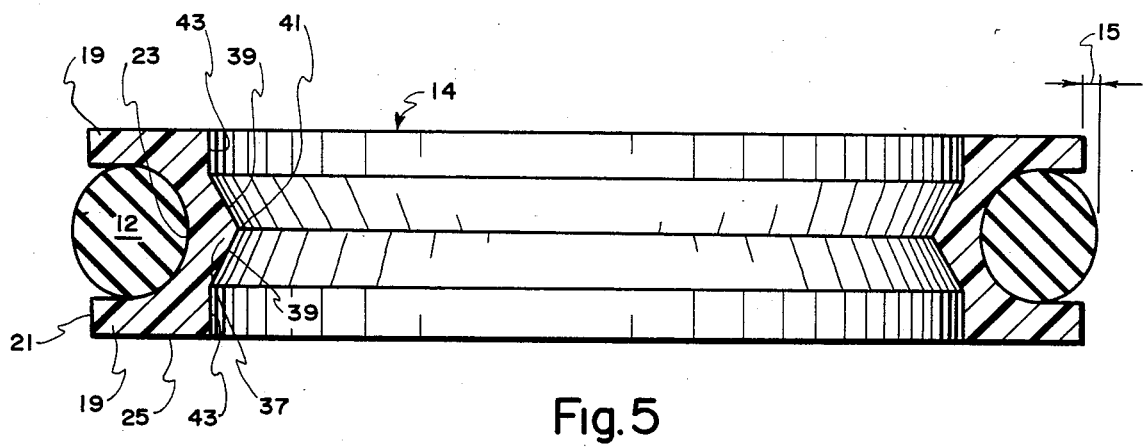
FIG. 5 is a cross-sectional representation of a second preferred two element seal assembly according to the present invention.

Reference is now made to the drawings wherein like numerals are used to designate like parts throughout. FIG. 1 in particular depicts, in an unstressed condition, a presently preferred two element, limited contact, high and low pressure seal assembly according to the present invention, which is generally designated 10. The seal assembly 10 comprises a resilient and yieldable spring element 12, illustrated as being generally circular in cross-section and formed of a relatively soft elastomeric material and a sealing element 14 which is generally house-shaped in cross-sectional configuration so as to straddle and encapsulate all but a small exposed portion of the surface area of the spring element 12, the sealing element 14 being formed of a relatively hard, tough and low wear elastomeric material. While the seal 10 is illustrated as being unitarily disposed in a groove of a piston or ram (see FIGS. 2-4), it is to be appreciated that other types of installation apply, e.g. the components can be fabricated in reverse orientation (as illustrated in FIG. 5) and used, for example, in a groove disposed at the interior wall of a cylinder in which a piston or ram reciprocates.

The spring element 12 as mentioned is illustrated as being substantially circular in cross section when in an unstressed condition and may, for example, be formed of a suitable synthetic resinous or other satisfactory elastomeric material. Thus, the spring element 12 is relatively soft and readily resilient and yieldable. For purposes of creating a static seal with the base of a machine groove in a manner hereinafter more fully described, the transverse dimension of the spring element 12 is selected so that the element 12 is received within an interior annular slot of the sealing element 14 and projects a short distance 15 beyond the limits of the sealing member 14.

The sealing member 14 as mentioned is generally house-shaped and comprises a central body 17 form which two narrow annular anti-extrusion legs 19 radially project. The legs 19 are of uniform width from the adjacent midpoint of the spring element 12 to the two terminal butt ends 21. The legs 19, beginning adjacent said midpoint of the spring member 12, arcuately merge along an arch 23 into the body 17. The diameter of the arch 23 may be substantially the same as the diameter of the spring element 12. Thus, the spring element 12 will snugly fit within and saddled between the legs 19 contiguous with the arch 23 and also project in an unstressed state through the disance 15 beyond the butt annular ends 21 of said legs 19.

The opposed exterior surfaces 25 of the legs 19 are radial, linear and parallel to each other. They are also perpendicular to the base 27 of a groove 29 formed annularly within a first machine part, i.e. piston 31. The two linear sidewalls 33 of the machine groove 29 are likewise perpendicular to the groove base 27 and parallel to the exterior surfaces 25 of the sealing member legs 19. Each exterior surface 25 terminates in a radial heel portion 35 at a location opposite the adjacent butt end 21.

A central delta-shaped annulus 37 projects radially outwardly from the body 17 comprising outwardly converging sloped or bevelled surfaces 39, which merge to form an apex 41.

An annular shoulder 43, parallel to but spaced from the axis of the piston 31, is interposed between each sloped face 39 and the adjacent heel 35 to form a corner therebetween.

The sealing member 14 is intended to be highly wear resistant and wear compensating, i.e. to provide, under the urging of the spring element 12 a wear compensation feature which prevents leakage due to wear. The sealing member is preferably formed of a suitable synthetic resinous material such as polyurethane or polyester.

From the foregoing, it is readily apparent that the sealing element 14 encloses most of the surface area of the spring element 12 between the anti-extrusion legs 19, which straddle all but the very small exposed portion 15 of the spring element 12. Therefore, the two element seal 10 functions unitarily. Not only do the legs 19 obviate extrusion of the sealing element 14, but surprisingly the sealing element 14 is uniquely restrained against rolling.

In addition, the two element seal 10 is typically stretched over a piston 45 (FIG. 2) and into said groove 29. The piston 31 is conventional and is conventionally secured to a piston rod 47 to reciprocate therewith. Normally, the radius from the axis of the piston rod to the inside of the circular spring element 12 is substantially the same as the radius from said piston rod axis to the base 27 of the groove 29. Thus, in the position of FIG. 2, normally the composite seal 10 is in an unstressed state.

Figure 2:
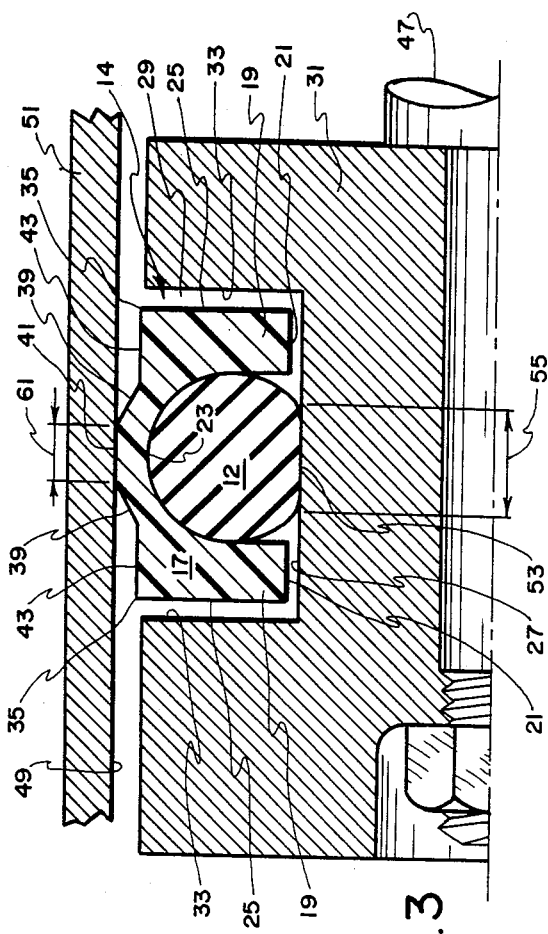
FIG. 2 is a cross-sectional view of the two element seal assembly of FIG. 1 placed within a groove of a piston shown as being removed from its cylinder.
Figure 3:
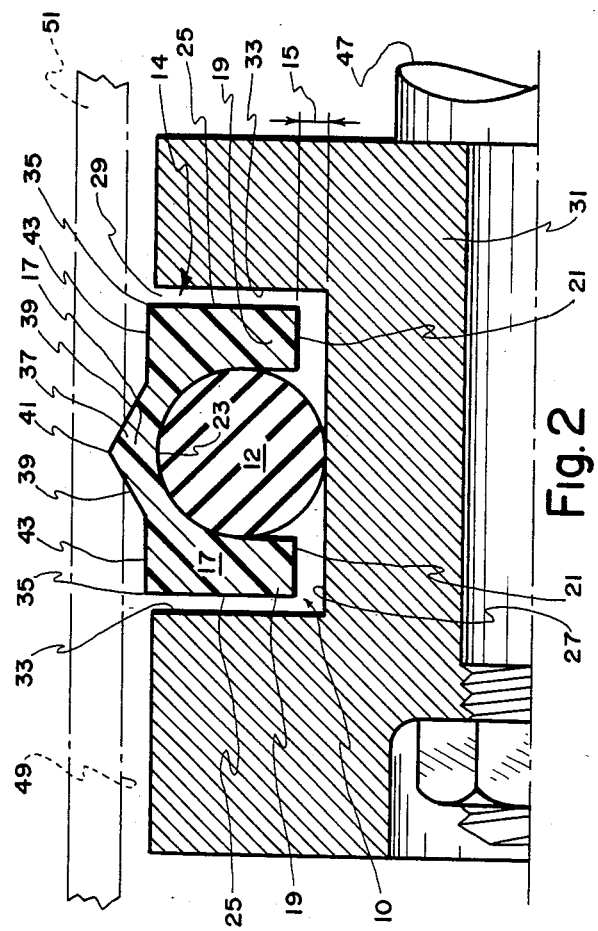
FIG. 3 is a cross-sectional representation similar to FIG. 2 but with the two element seal assembly and piston placed within the cylinder.

Once the state depicted in FIG. 2 is achieved, the piston rod 47 with piston 31 attached and carrying the composite seal 10 in the groove 29, is placed within a second machine part, i.e. the barrel 49 of a cylinder 51. See FIG. 3. The seal 10 is formed so that the diameter of the annular apex 41 is greater than the diameter of the cylinder barrel 49. Accordingly, the composite seal 10 is caused to be placed in a radially compressive stressed state when positioned as illustrated in FIGS. 3 and 4. The radial compression flattens the spring member 12 against the base 27 of the groove 29 at site 53 covering a distance 55 which is on the order of about the diameter of the spring element 12. Since there is no relative movement of machine parts at site 53, site 53 is a static seal site (when the seal 10 is subjected to fluid pressure, as illustrated in FIG. 4). Such fluid pressure, if sufficiently high, will cause a slight deformation in the spring member 12 along its contiguous interface with the groove base 27 and will displace the entire composite seal 10 unitarily along the groove base 27 without rolling so that the leg 19 opposite the leg 19 being subjected to fluid pressure is caused to be contiguous with the adjacent groove wall 33 to form an anti-extrusion seal at site 57 having a substantial interface as indicated by the distance 59. See FIG. 4. To achieve the above-described dynamic static and anti-extrusion seal sites, the axial dimension of the groove 29 is preferably about ten percent (10%) greater than the axial dimension of the seal 10.

Again as is also best illustrated in FIG. 4, the heel 35 preferably projects radially beyond the diameter of the piston 31 and is caused to bite into the corner of the piston at the radial outward end of groove wall 33 at said site 57. However, the shoulders 43 may be flush with or slightly within the machine groove 29, if desired.

In the radially compressed state, the apex 41 is slightly flattened to form a narrow ribbon, band or line seal site contact area 61 (FIG. 4). The axial distance of the site 61 is substantially less than the axial dimension of the composite seal 10. The resistant seal pressure developed along the narrow line, ribbon or band 61 comprises a remarkably high resistant pressure in pounds per square inch which is substantially higher than the maximum hydraulic or pneumatic pressure applied to the seal assembly. As a result, the composite seal 10 is unitarily stable, highly resistant to deformation and extrusion, and prohibits fluid displacement across the seal 10. The seal 10 also provides surprising wear take up, low cost, ease of installation, and long life characteristics, as well as resistance to individual or collective seal failure. A plurality of dynamic seals or dynamic seal sites are avoided as are misorientation, twisting and extrusion of the composite seal. The seal is also resistant to high and low pressures, a wide range of temperatures, fluids and abrasion.

As illustrated in FIG. 5, the orientation of the seal 10 may be reversed with the sealing element 14 directed radially inwardly and it may be placed in a groove disposed in the outer one of two relatively movable parts (e.g. the cylinder wall) so as to engage and seal against the inner second relatively moving part (e.g. the piston) in the same fashion and with the same advantages as mentioned in conjunction with the embodiment of FIGS. 1 through 4.

Reference is now made to FIGS. 6-8, which illustrate a third presently preferred seal assembly embodiment, generally designated 100, fashioned in accordance with the present invention. Seal assembly 100 is illustrated in its unstressed condition in FIGS. 6 and 7 and in its installed, stressed and pressurized condition in FIG. 7. Seal assembly 100 comprises a spring element 102, which is illustrated as being square in cross section and is formed of a relatively soft elastomeric material. Seal assembly 100 also comprises a house-shaped sealing element 104.

Sealing element 104 is, with the exception of its hollow annular interior identical or substantially identical in its configuration to previously described sealing element 14. Those parts which are identical or substantially identical have been labeled in FIGS. 6–8 with the same numerals as used in conjunction with sealing element 14 and no further discription thereof is needed. The two anti-extrusion legs 19 are of uniform width throughout their respective lengths defining, respectively, an interior wall surface 106. The length of each wall surface 106 is substantially less than the length of exterior wall surfaces 25, thereby defining the depth of the interior annular recess formed by the sealing element 104. The base 108 of the interior recess is perpendicular to the interior walls 106.

The spring element 102 is shown as square in cross section as mentioned earlier and formed of a relatively soft elastomeric material. The axial dimension 110 is illustrated as being equal to the radial dimension 112 of the spring element 102, although rectangular configurations may also be used. The dimension 110 is also substantially equal to the interior base 108 of the sealing element 104 so that the surface 108 of the sealing element becomes entirely contiguous with the surface 114 of the spring element.

However, the radial dimension of the surfaces 106 is slightly less than the radial dimension 112 of the spring element side surfaces 116 and 118. Thus, when installed, as shown in FIG. 8, the base edges 21 of the spring element remain slightly spaced from the base 27 of the machine groove with the base surface 120 of the spring element contiguously engaging the machine groove 27 along the entire length 110.

The static and dynamic seal areas are as heretofore described in conjunction with the first two embodiments, except interior surfaces 106 are entirely contiguous with radially directed spring element surfaces 116 and 118 thereby enhancing the unitary action of the sealing element and spring element during use. The square (or rectangular) spring element 102 tends to bite at the corners thereof and, accordingly, has substantial resistance against any tendency to roll.

Reference is now made to FIG. 9 which illustrates a further presently preferred sealing element in accordance with the present invention, generally designated 130. Sealing element 130 is to be used in conjunction with any spring element in accordance with the present invention. Sealing element 130 is, with the exception of the tip portion of the delta shaped apex, identical or substantially identical to the previously described seal element 12. Accordingly, numerals designating parts which are identical or substantially identical are also used in FIG. 9 and no further description thereof is believed to be needed. The apex portion 132 comprises a pair of rounded annular shoulders 134 and 136 with an annular groove 138 interposed therebetween. Under high pressure conditions during use, the engagements of the tip portions 134 and 136 with the machine part wall 43 will exert greater pressure than will engagement of the groove portion 38. Under lower pressures, the surface comprising the groove 38 will retain a small amount of hydraulic fluid, which serves to lubricate the machine surface 49 during movement of the sealing element 130 along the surface. In either event, the engagement of apex portion 132 with machine wall 49 will be essentially a narrow sealing area as heretofore described in conjunction with the present invention.

The invention may be embodied in other specific forms without departing from the spirit or essential characteristics thereof. The present embodiments are therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A compression high pressure/low pressure seal assembly, solely made up of two elements in combination with two closely spaced relatively reciprocable machine parts, the first of the machine parts having a peripheral groove comprising spaced sidewalls and a base between the sidewalls, the assembly comprising:

an endless relatively soft annular spring element of yieldable material with memory and having a yieldable solid cross-sectional configuration;

an endless annular sealing element comprising a house-shaped body of relatively hard wear resistant synthetic resinous material having a generally U-shaped cross-sectional configuration;

said sealing element further comprising spaced radially directed anti-spring contact elongated anti-extrusion and anti-roll legs, which comprise a size, shape and thickness to, at all times within a predetermined high-to-low pressure range, (a) keep the spring element from touching either groove sidewall and (b) maintain an essentially stable radial alignment between the spring element and the sealing element, the length of each of said elongated legs being coextensive with substantially the entire adjacent sidewall, a thin space separating the end of each elongated leg and the base of the groove;

the spring element being positioned between and having a radial dimension extending beyond the ends of the elongated legs across said thin space to compressively engage the base of the groove while preserving the thin space thereby accommodating creation of a first static seal solely and directly between the extended part of the spring element and the base of the groove in the first machine part while prohibiting any sealing relation between the sealing element and the base of the groove;

the interior surface formed by and between the elongated legs comprising saddle region means which comprises a contiguous nested relationship with the exterior surface of the spring element;

a second static seal being formed solely and directly between one exterior elongated leg surface and substantially all of one sidewall of the groove while prohibiting any sealing relationship between the spring element and either groove sidewall whereby at all times, when under pressure from one side or the other of the seal assembly, the elongated leg away from the pressure is caused to be contiguous with essentially the entire surface of the adjacent sidewall and at all times said elongated legs maintain the spring element in spaced relationship with both sidewalls of the groove and in direct radial alignment with the sealing element;

said house-shaped portion of the sealing element, which at all times isolates the spring element from contact with the second machine part, comprising an anti-drift delta-shaped projection having central disposed narrow apex means retained in radial alignment with the spring element, the projection extending radially opposite to the direction of said anti-extrusion and anti-roll legs and beyond said groove, the apex compressively engaging the surface of a second machine part in such a fashion so as to cause said apex to no more than slightly flatten solely at the tip region thereof and to create an annular line dynamic seal solely along the entirety of the 360 degrees of said slightly flattened tip region and in direct radial alignment with the centerline of the spring element, the width of said line seal being several times less than the width of the groove whereby a surprisingly stable high pressure resistance is developed in excess of any hydraulic or pneumatic pressure applied to the seal assembly.

2. A two element high pressure/low pressure compression seal assembly in combination with two machine parts according to claim 1 wherein the interior between the elongated anti-spring contact, anti-extrusion and anti-roll legs of the sealing element is generally U-shaped and configurated to substantially match the contiguous exterior configuration of the spring element such that the spring element is snugly seated and retained between said legs in a tight saddle arrangement whereby the elements of the seal assembly act and respond in unison.

3. A two element high pressure/low pressure compression seal assembly in combination with two machine parts according to claim 1 wherein said anti-drift delta-shaped projection is interposed between and integral with two spaced circumferential shoulders which are disposed radially beyond the limits of said groove.

4. A two element high pressure/low pressure compression seal assembly in combination with two machine parts according to claim 3 further comprising a heel connected to but disposed substantially perpendicular to each said shoulder.

5. A two element high pressure/low pressure compression seal assembly in combination with two machine parts according to claim 1 wherein said delta-shaped projection extends inwardly.

6. A compression high pressure/low pressure seal assembly, consisting solely of two elements, the assembly comprising:

an endless relatively soft annular spring element of yieldable material with memory having a solid cross section and adapted to compressively engage a groove in a first machine part only at the base thereof;

an endless annular house-shaped sealing element of relatively hard synthetic resinous material having a generally U-shaped cross-sectional configuration comprising (a) a pair of substantially parallel radially directed elongated anti-extrusion and anti-roll legs straddling the majority of the perimeter surface area of the spring element, the inside length of the elongated anti-extrusion and anti-roll legs being substantially coextensive with the diametral dimension of the spring element except for a thin radial base increment of the spring element, the legs entirely isolating the spring element from contact with either sidewall of the groove and (2) substantially maintaining radial alignment between the spring element and the sealing element, both during use of the seal assembly within a predetermined high pressure/low pressure range, a small exterior surface area of the spring being disposed in said thin radial base increment and slightly radially exposed beyond said elongated anti-extrusion and anti-roll legs and the surface area of the U between the elongated anti-extrusion and anti-roll legs contiguously engaging the exterior surface area of the spring element whereby the two elements respond to said predetermined range of pressures applied to the seal assembly in unison without material distortion, extrusion or roll phenomena in the seal assembly so that at all times, when under pressure from one side, one leg is caused to be contiguous with essentially the entire surface of the adjacent sidewall of the machine part groove while at the same time said one leg prevents the spring from contacting the sidewall thereby maintaining radial alignment between the sealing element and the spring element, and (b) an oppositely radially directed delta-shaped annular exposed dynamic sealing ridge, which at all times isolates the spring element from contact with the second machine part, comprising an ultra thin apex and opposed bevelled surfaces sloped oppositely away from the apex whereby a single dynamic line seal is created solely between the apex and a second machine part providing surprisingly high stable pressure resistance at the apex in excess of any pressure within the range of pressures applied to the seal whereby low pressure drift between the machine parts due to leakage at the apex of the sealing element is obviated.

7. A compression high pressure/low pressure seal assembly, solely made up of two elements in combination with two closely spaced relatively reciprocable machine parts, the first of the machine parts having an annular peripheral groove comprising spaced radially directed sidewalls and an axially directed base between the sidewalls, the assembly comprising:

an endless relatively soft annular spring element of yieldable material with memory and having a yieldable solid rectangular cross-sectional configuration and adapted to compressively engage only the base of the groove;

an endless annular sealing element comprising a house-shaped body of relatively hard wear resistant synthetic resinous material having a generally box-shaped interior groove when viewed in cross-section;

said sealing element further comprising spaced radially directed elongated anti-extrusion and anti-roll legs, comprise a size, shape and thickness to, at all times within a predetermined high-to-low pressure range, (a) which keep the spring element from touching either groove sidewall and (b) to maintain an essential stable radial alignment between the spring element and the sealing element, each leg having radially parallel exterior and interior surfaces, each exterior leg surface being radially longer than each interior leg surface, the axial distance between the interior leg surfaces being uniform throughout, a base surface spanning perpendicular between the interior leg surfaces thereby defining said box-shaped interior groove in the sealing element, a thin space separating the end of each elongated leg and the base of the groove, the rectangular spring element being positioned snugly within the box-shaped interior groove and having a radial dimension extending beyond the ends of the elongated legs across said thin space to compressively engage the base of the groove while preserving the thin space thereby accommodating creation of a first static seal solely and directly between the extended part of the spring element comprising a flat exposed base surface and the base of the groove in the first machine part while prohibiting any sealing relation between the sealing element and the base of the groove, the base surface and the interior surfaces of the box-shaped interior groove being entirely contiguous and tightly mated with exterior surfaces of the spring element, a second static seal being formed solely and directly between one exterior elongated leg surface and substantially all of one sidewall of the groove while prohibiting any sealing relationship between the spring element and either groove sidewall, whereby at all times, when under pressure from one side or the other of the seal assembly, the elongated leg away from the pressure is caused to be contiguous with essentially the entire surface of the adjacent sidewall and at all times said elongated legs maintain the spring element in spaced relationship with both sidewalls of the groove and in direct radial alignment with the sealing element;

said house-shaped portion of the sealing element, which at all times isolates the spring element from contact with the second machine part, comprising a delta-shaped projection having central disposed narrow apex means retained in direct radial alignment with the spring element, the projection extending radially opposite to the direction of said anti-extrusion and anti-roll legs and beyond said machine part groove, the apex compressively engaging the surface of a second machine part in such a fashion so as to cause said apex to no more than slightly flattened solely at the tip region thereof and to create an annular line dynamic seal solely along the entirety of the 360 degrees of said slightly flattened tip region and in direct radial alignment with the centerline of the spring element, the width of said line seal being several times less than the width of the groove, whereby a surprisingly stable high pressure resistance is developed in excess of any hydralic or pneumatic pressure applied to the seal assembly.

8. A compression high pressure/low pressure seal assembly, consisting solely of two elements, the assembly comprising:

an endless relatively soft annular spring element of yieldable material with memory having a solid rectangular cross section and adapted to compressively engage a groove in a first machine part only at the base thereof:

an endless annular house-shaped sealing element of relatively hard synthetic resinous material having an interior generally rectangularly shaped groove, the sealing element comprising (a) a pair of substantially parallel radially directed elongated anti-extrusion and anti-roll legs being entirely contiguous with the perimeter surface area of the rectangular spring element, a thin radial distance existing between the ends of the legs and a base surface of the spring element, the legs (1) entirely isolating the spring element from contact with either sidewall of the groove and (2) substantially maintaining radial alignment between the spring element and the sealing element, both during use of the seal assembly within a predetermined high pressure/low pressure range, whereby the two elements respond to said predetermined range of pressures applied to the seal assembly in unison without any material distortion, extrusion or roll phenomena in the seal assembly so that at all times, when under greater pressure from one side, the exterior surface of one leg is caused to be contiguous with essentially the entire surface of the adjacent sidewall of the machine part groove while at the same time said one leg prevents the spring from contacting the sidewall thereby maintaining radial alignment between the sealing element and the spring element, and (b) a radially directed delta-shaped annular exposed dynamic sealing ridge, which at all times isolates the spring element from contact with the second machine part, comprising thin apex means and opposed bevelled surfaces sloped oppositely away from the apex whereby a single dynamic line seal is created solely between the apex and a second machine part providing surprisingly high stable pressure resistance at the apex in excess of any pressure within the range of pressures applied to the seal whereby low pressure drift between the machine parts due to leakage at the apex of the sealing element is obviated.

* * * * *